(No Model.)
F. F. LOOMIS.
SIGNALING APPARATUS FOR ELECTRIC RAILWAYS.
No. 440,881. Patented Nov. 18, 1890.
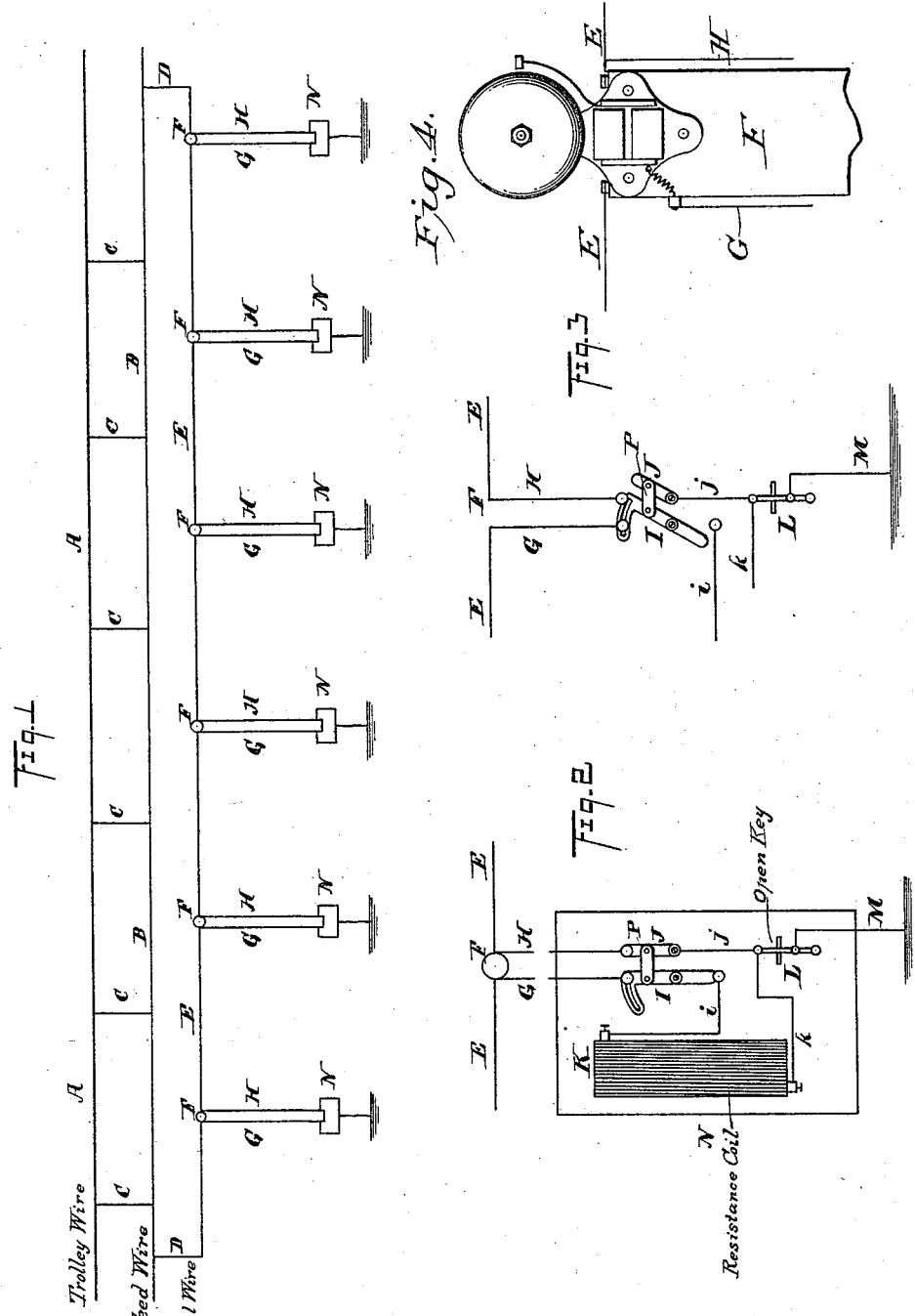
Witnesses:
Belle S. Loomis
C. E. Humphrey
Inventor
Frank F. Loomis,
by C. P. Humphrey
Attorney.

UNITED STATES PATENT OFFICE.

FRANK F. LOOMIS, OF AKRON, OHIO.

SIGNALING APPARATUS FOR ELECTRIC RAILWAYS.

SPECIFICATION forming part of Letters Patent No. 440,881, dated November 18, 1890.

Application filed March 15, 1890. Serial No. 343,970. (No model.)

*To all whom it may concern:*

Be it known that I, FRANK F. LOOMIS, a citizen of the United States, residing at Akron, in the county of Summit and State of Ohio, have invented a certain new and useful Improvement in Signaling Apparatus for Electric Railways, of which the following is a specification.

My invention has relation to electric railways, in which the motive power is communicated from dynamo-electric machines, in what is called a "power-station," through a "feed-wire," to a "trolley-wire," and thence by means of a trolley to the motor of the car.

The object of my invention is to provide a system whereby the current from the power-station may be utilized for the purpose of conveying signals from selected stations simultaneously to determined points along the line of railway in case of accident, as the derailment of a car, or whenever it is desired to transmit signals from one point of the line to a number of other points, and to provide devices for operating said system.

To this end my invention consists of the peculiar and novel devices, construction, arrangement, and combination of parts hereinafter described, and then specifically pointed out in the claims, reference being had to the accompanying drawings, forming a part of this specification.

In the accompanying drawings, in which similar letters of reference indicate like parts, Figure 1 is a diagram ilustrating my invention; Fig. 2, a diagram illustrating the several parts included in the transmitting-station; Fig. 3, a similar view of some of the parts in different positions; and Fig. 4 represents a form of signal that may be used at transmitting-stations.

A is the trolley-wire, and B the feed-wire, connected at intervals with the trolley-wire by short wires C.

E is the signal-wire, and is a separate wire electrically connected at each end with the wire B by wires D. At intervals F, in its length, as at every fifth supporting-pole, there is a loop in the wire E, the sides of which, for the purpose of further description, are marked G H, and enter boxes N. This box constitutes the transmitting-station and contains a switch, a circuit-breaker, as a key, connected with a ground-wire, and except as hereinafter stated, a resistance-coil, the object of which is hereinafter explained. The wires G H terminate in insulated binding-posts inside the box, and when the box is not in use are directly connected by a part of the switch.

The form of switch is preferably that shown in Figs. 2 and 3, and consists of two bars I J, pivoted side by side, the former at its center and the latter at the lower end united by a pivoted non-conducting bar P, so as to swing in unison, the upper end of the former arranged, as by a slotted segment, to be constantly in contact with the binding-post of the line G, and when swung in the position shown in Fig. 3 to form a contact with the post of the line H, and when swung away from the latter post the upper end of the bar J will be brought in contact with said post.

K is a resistance-coil, one end whereof is connected by a wire *i* with a binding-post, which the lower end of the bar I forms a contact with when swung away from the binding-post of the line H. The opposite end of the resistance-coil is connected with an open key L by a line *k*, which key is also connected with the bar J by a line *j*.

M is a ground-wire, connected with the contact-stud of the key L. Hence when the switch is closed, as illustrated in Fig. 3, the lines G H are electrically united by the curved top of the bar I, and when open, as shown in Fig. 2, the resistance-coil and key are included in the circuit. By closing the key L a ground-connection is made with both wires G and H.

The resistance-coil K is omitted from the box N when the latter is equidistant from each end of the wire E; but when the box is nearer one end a resistance-coil is interposed to be connected with the shorter wire when the box is used, and of such resistance as to equal the resistance of the excess of the longer over the shorter, and thus equalize the currents from each direction at the key.

Interposed in the wire E at desired points, but preferably at the points F, are a series of signaling devices, as a bell (see Fig. 4) or flag, target, lamp, semaphore, or dial, arranged to be simultaneously actuated by the current from the feed-wire B when a ground-connection is made at any point in the signal-wire F.

As my invention is not intended to be confined to any particular kind of signaling device, but is equally applicable to any sort that may be actuated by an electric current, its application and operation will be readily understood by persons skilled in the art to which this invention pertains.

In the class of electric railways to which this invention pertains as now operated the signal-wire is preferably conducted parallel with the trolley-wire and sustained by insulators on poles that support the feed-wire, the loops passing down said poles to the boxes attached thereto, and the signals supported by said poles.

The switch, resistance-coil, and key are preferably placed together in an inclosing-case, and the switch arranged to be operated by the opening and closing of the case.

Other switches that will accomplish the same purpose may be substituted for the form shown in Figs. 2 and 3, and other devices for offering resistance to the electric current, as incandescent lamps, may be substituted for the resistance-coil K without departing from my invention.

Having thus described my invention, what I claim, and desire to secure by Letters Patent, is—

1. A signaling system for electric railways of the kind designated, consisting, essentially, of an auxiliary wire connected with the feed-wire and provided with electrically-actuated signaling apparatus, and devices interposed along said wire for causing the current from the feed-wire to actuate the signaling apparatus, substantially as shown and described, and for the purpose specified.

2. A signaling system for electric railways of the kind designated, embodying the following elements: an auxiliary wire connected at each end with the feed-wire, a series of signaling devices disposed at intervals along said auxiliary wire and arranged to be actuated by the current from the feed-wire, a series of signaling-stations containing a circuit-breaker connected with a ground-wire, and a switch to connect the circuit-breaker with the auxiliary wire, substantially as shown and described.

3. In a signaling system for electric railways of the kind designated, the combination, with an auxiliary wire connected with the feed-wire and provided with signaling devices arranged to be actuated by the current from the feed-wire when a ground-connection is made with said auxiliary wire, of a series of signaling-stations containing means, as a key, for making such ground-connections, each station not equidistant from the ends of said feed-wire containing a resistance-coil connected with the shorter portion of said wire, substantially as shown and described, and for the purpose specified.

4. In a signaling-station for electric railways of the class designated, the combination, with the terminals of the auxiliary wire, of the switch, the resistance-coil connected with one of said terminals, the key, and the ground-wire, all substantially as shown, and for the purpose specified.

In testimony that I claim the above I hereunto set my hand.

FRANK F. LOOMIS.

In presence of—
C. E. HUMPHREY,
C. P. HUMPHREY.